July 19, 1949.    F. J. SPANG    2,476,434

FLOAT VALVE

Filed Feb. 27, 1946

INVENTOR
Ferdinand J. Spang
BY
Green, McCallister & Miller
ATTORNEYS

Patented July 19, 1949

2,476,434

UNITED STATES PATENT OFFICE 2,476,434

FLOAT VALVE

Ferdinand J. Spang, Butler, Pa.

Application February 27, 1946, Serial No. 650,566

8 Claims. (Cl. 137—69)

This invention relates to valvular apparatus, and particularly, to float valves for use in well casings to prevent fluid from the drill hole from entering into a string of casing while it is being lowered through the fluid column and to permit fluid or cementitous material to be passed therethrough from the upper end of the casing string to seal off water stratum.

Broadly speaking, a "float" valve as referred to herein is one that may be employed to close off a casing string from fluids in the drill hole in such a manner as to, in effect, utilize fluid pressure to at least partially offset casing weight. A "floating" valve as referred to herein is one that, in effect, is buoyed to a closed position by a liquid or a mass having some of the characteristics of a liquid.

There have been various types of float valves used in connection with well casings and shoes. Such valve devices have, however, had disadvantageous features. For example, spring-positioned valves, as heretofore employed, have not worked too satisfactorily due to the fact that the spring mechanism tends to get clogged with the mass or fluid of the drill hole as well as with cementitious material used to seal off water flow. These and other mechanisms have heretofore been rather complicated and subject to breakage, and in general, require especially constructed shoe or connector members to mount them in position.

It has been an object of my invention to provide an improved form of valve that may be used with well casing or pipe members.

Another object has been to devise a simple and foolproof type of valve of economic construction that requires no special type of connector or shoe member for mounting it in position.

A further object has been to provide an improved fluid seal between a valve and the members within which it is positioned.

A still further object of my invention has been to provide a valve for well casing or pipe members that may be relatively loosely mounted or positioned within the casing members and that will, at the same time, provide a positive fluid seal with innerwalls of such members.

These and many other features of my invention will appear to those skilled in the art from the descriptive embodiment thereof and the claims.

Valves of the type in question have been useful in the oil field art in that by sealing off fluid flow from the drill hole up through the casing, they in effect float the casing as it is being lowered and thus lessen the effective strain upon or weight of the casing or pipe string.

Figure 1:
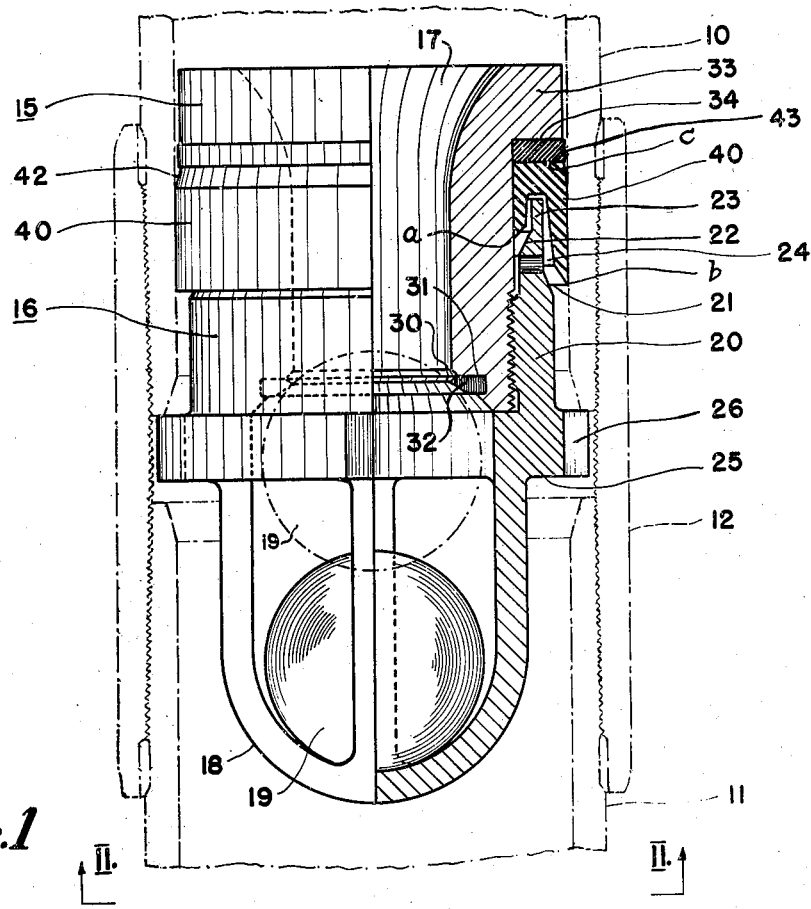

Referring to the drawings, Figure 1 shows a side view in elevation of an assembly employing a preferred embodiment of my invention in a mounted relationship adjacent a connector sleeve for a pair of casing members; the right hand portion of this figure is in section.

Figure 2:
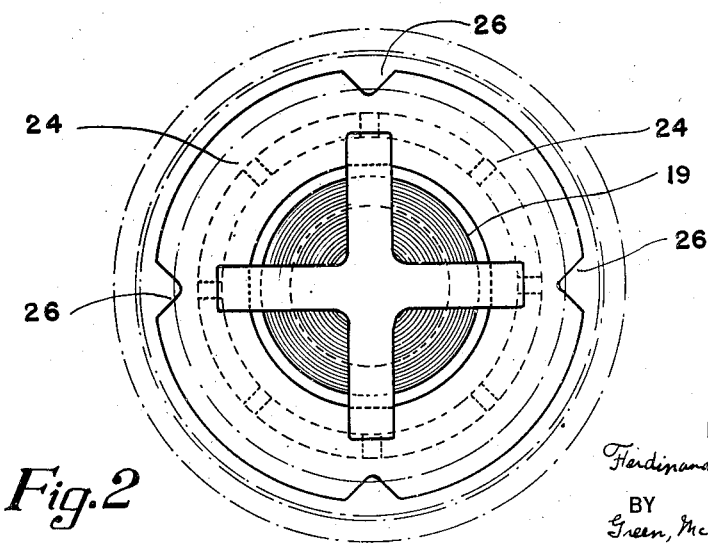

Figure 2 is an end sectional view taken along the line II—II of Figure 1, showing a lower end of the valve.

In Figure 1 of the drawings, the valve embodiment is shown in its normally mounted relationship within a string of casing comprising an upper pipe member or length 10, a lower member or length 11, and a connector member 12. It will be noted that the upper and lower casing lengths or members 10 and 11 are normally externally threaded to engage internal threads of the connector 12 and that their ends are in a spaced apart relationship. The valve arrangement of my invention is preferably positioned within such spacing after the connector member 12 has been mounted on the lower member 11 and before the member 10 has been screwed into the member 12. In other words, the valve assembly may be dropped or slid into position against the upper end of the lower member 11 before the next casing length is connected and lowered into the drill hole. The valve assembly is free to rotate within the upper member 10 as the latter is being turned into position. The lower member 11, as will be apparent to those skilled in the art, may be a pipe length or a casing shoe.

The valve housing comprises a pair of interfitting elements 15 and 16 which define a fluid passageway 17 therethrough, and thus, through the casing string. What may be termed the lower element 16 of the valve is provided with lengthwise extending cage portions 18 for operably positioning a ball valve 19 therein. Fluid is thus free to enter through open spaces of the cage 18 and cause vertical movement of the floating valve 19 within prescribed limits.

The other end of the element 16 has lengthwise or upwardly extending cup or annular portions 20 that are provided with inner or female threads adapted to mesh with male or outer threads of the element 15 in such a manner that the elements 15 and 16 are removably assembled. What may be termed the upper element 15, also of cup or annular shape, is provided with an inwardly sloped valve seat 30, and if desired, with a slotted portion 31 therein for receiving a suitable resilient valve seating ring or washer 32. The ball valve 19 is made of a material having a lower specific gravity than the liquid in the well bore, and as shown by the dot and dash lines of Figure 1, liquid entering the lower end of the casing string will cause the valve 19 to float and raise into abutment with the seating material 32 to positively close off flow through the passageway 17 from below. The ball 19 rests in its lower position within the cage 18 during the lowering of the casing until such time as it contacts the liquid; air and gas thus escape before the valve is closed.

The cup shaped portion 20 of the valve element 16 is provided with an extending side or mounting flange portion 23, also of annular shape, for receiving a somewhat U-shaped resilient fluid sealing element 40. The portion 23 is connected to the portion 20 by reverse slope portions 21 and 23; lateral slots or bleeder holes 24 provide fluid passageway for equalizing fluid pressure on opposite sides of mounting flange 23.

The element 15 is provided with an outwardly or laterally offset portion 33 having an abutment face 34 for receiving a support washer ring or annulus 43 that is adapted to cooperate with and abut against and position a heel portion c of the resilient sealing element 40. The resilient fluid sealing element 40 is provided with feather edges a and b that abut inner walls of the casing 10 and outer walls of the element 15 and represent outer limits of a fluid pressure chamber defined within the element 40. The heel portion a of the sealing element 40 is preferably slightly bevelled at 42 to permit the material to be expanded within the operating space provided as the fluid pressure increases within the chamber thereof. I prefer to provide an annulus 43 of any suitable material having less resiliency and more tensile strength than the element 40 to limit plastic flow of the latter.

The lower element or housing portion 16 of the valve is provided with a laterally outwardly extending circular flange portion 25 which corresponds substantially in outer dimension to the inner dimension of the connecting member 12. Flange 25 thus positions the valve within spacing between ends of the casing members 10 and 11.

I provide one or more slots or apertures 26 through the flange 25 and apertures or slots 24 through the extending portion 23 to permit pressure fluid to freely enter the chamber formed by the flexible sealing element 40. Thus, the greater the pressure exerted by the fluid upon inner portions of the element 40, the greater will be the holding or sealing action effected thereby, in that it will deform within the limits of its confined area and its feather edges a and b will positively seal off fluid leakage between inner walls of the casing members and outer portions of the valve device. The element 40 may be of any suitable material such as rubber that is incompressible but capable of flowing and fluid pressure translation into a corresponding sealing force.

At the same time, as the valve 19 is being floated into a closed position, the sealing element 40 has expanded and its feather edges a and b form a tight seal between the outer wall member of the valve and inner walls of the casing, regardless of the vertical position of the flange 25 within the spacing provided between opposing ends of members 10 and 11. It will be noted that the element 40 is positioned to one side of the spacing between members 10 and 11 and that it will tend to lock the valve housing portions 15 and 16 in vertical position when gas or liquid pressure is exerted within its chamber.

When sufficient casing has been run it may be the desire of the operator to pump cement down through the casing into the bottom of the hole and displace some of the fluid along the lower joints with cement. When a column of fluid cement enters the casing above the ball 19 and sufficient pressure is applied thereto, it will cause the ball to move downwardly, permitting the cement to flow past it; and, when the process has been completed, the ball 19 will again rise to the valve seat 30 and prevent the backward flow of cement.

"Pipe members" as employed in the claims, unless otherwise indicated, include casing and connector or sleeve members as well as shoe members. A "casing" member as defined in the claims, unless otherwise indicated, includes a shoe or similar member.

It will be obvious that all parts of the valve may be made of a metal, such as aluminum or an aluminum alloy, cast iron, or other suitable material which may be easily drilled, such as plastic (e. g. Bakelite). I contemplate drilling it out of place by a suitable means such as a cable tool or rotary drill.

While I have shown a specific embodiment of my invention for the purpose of description, it will be apparent to those skilled in the art that additions, subtractions, or alterations may be made thereto and other combination arrangements devised therefrom without departing from its spirit and scope as indicated by the following claims.

What I claim is as follows:

1. A float valve structure adapted to close off fluid flow in one direction through connected casing members comprising, a valve housing having an extending annular flange constructed and arranged to cooperate with opposed ends of the connected members for positioning said housing, said housing defining a fluid passageway therethrough, a valve seat about said passageway, a valve element sensitive to fluid entering the casing members and constructed and arranged to cooperate with said valve seat to close off fluid flow in one direction through the casing members, a fluid-sensitive sealing means, said housing having portions operably positioning said sealing means between outer wall portions of said housing and inner wall portions of one of the casing members, and a fluid passageway through said annular flange for by-passing fluid to said sealing means.

2. A float valve structure adapted to be operably positioned within connected well string casing members comprising, a valve housing having an extending annular flange portion constructed and arranged to cooperate with opposed ends of the connected casing members to position said housing within the casing members, said housing having portions defining a fluid passageway therethrough, a valve seat about said passageway, a fluid-sensitive valve element operably positioned on a lower end of said housing and constructed and arranged to cooperate with said seat to close off said passageway, an annular flange extending upwardly from outer wall portions of said housing, an annular fluid-sensitive sealing means operably positioned over said upwardly extending flange and having portions defining a pressure chamber adjacent said flange, said sealing means having edge portions constructed and arranged to abut outer wall portions of said housing and inner wall portions of an upper casing member, and fluid passageways through said housing positioning flange and said upwardly extending flange to by-pass fluid from a lower casing member to the pressure chamber of said sealing means.

3. A float valve structure adapted to be operably positioned within a connected pipe member combination comprising, a valve housing having a cup shaped element defining a fluid passageway therethrough, said valve housing having a cylindrical element defining a fluid passageway therethrough connected with the fluid passageway of said first-mentioned element, said second-mentioned element having inner wall portions constructed and arranged to fit over outer wall portions of said first-mentioned element, means removably securing inner wall portions of said second-mentioned element to outer wall portions of said first-mentioned element, a valve element, said second-mentioned element having portions operably mounting said valve within the fluid passageway thereof, a valve seat about inner wall portions of said first-mentioned element and constructed and arranged to receive said valve element to close off the fluid passageway through said first-mentioned element, a flange extending laterally from outer walls of said second-mentioned element to cooperate with the pipe member combination for mounting said pair of elements therein, said second-mentioned element having a flange extending lengthwise towards said first-mentioned element, resilient sealing means having wall portions defining a fluid pressure chamber, said sealing means being constructed and arranged to be positioned over said lengthwise extending flange, a fluid passageway through said mounting flange, and a fluid passageway through said lengthwise extending flange for by-passing fluid to the pressure chamber of said sealing means.

4. A float valve structure adapted to be operably positioned within a connected pipe member combination comprising, a valve housing having an extending flange for mounting said housing within the pipe member combination, said housing having inner wall portions defining a fluid passageway therethrough, a ball valve, a cage extending from an end of said housing over said passageway and operably positioning said ball valve therein, a valve seat about said passageway and constructed and arranged to receive said ball valve and close off said passageway, a sealing element mounted on said housing and constructed and arranged to extend into abutment with inner walls of the pipe member combination, said sealing element having portions defining a fluid pressure chamber therein, and a passageway through said mounting flange for by-passing fluid to the pressure chamber of said sealing element.

5. A float valve structure adapted to be operably positioned within a connected pipe member combination comprising, a valve housing having a portion for mounting said housing within the pipe member combination, said housing having inner wall portions defining a fluid passageway therethrough, a ball valve, a cage extending from an end of said housing over said passageway and operably positioning said ball valve therein, a valve seat about the inner wall portions of said housing, said valve seat being constructed and arranged to receive said ball valve and close off said passageway, a resilient sealing element having wall portions defining a fluid pressure chamber and terminating in feathered edges, a flange on said housing constructed and arranged to extend within the fluid pressure chamber of said sealing element and to position said element in such a manner that one feathered edge portion is in abutment with outer walls of said housing and another feathered edge portion is adapted to abut inner walls of the pipe member combination, said valve structure being constructed and arranged to provide fluid passageways to the fluid chamber of said sealing element.

6. A float valve structure adapted to be operatively positioned within a connected pipe member combination comprising, a valve housing having a means for mounting said housing within the pipe member combination, said housing having inner wall portions defining a fluid passageway therethrough, a ball valve, means operably positioning said ball valve over said passageway, a valve seat about the inner walls of said passageway constructed and arranged to receive said ball valve and close off said passageway when fluid pressure is exerted against said ball valve towards said valve seat, a resilient seating element, said housing having a laterally extending annular flange portion, an annular flexible ring positioned upon a lateral abutment wall of said flange portion and being constructed and arranged to extend between outer portions of said housing and inner walls of the pipe member combination, said housing having an annular flange extending lengthwise therefrom towards the lateral abutment wall of said flange portion, a resilient sealing element having a pressure heel and wall portions defining a fluid pressure chamber, said pressure heel being positioned in abutment with said flexible ring and over said lengthwise extending flange, the wall portions of said sealing element terminating in feathered edges and being constructed and arranged to abut outer walls of said housing and inner walls of the pipe member combination said valve structure having fluid passageways to the fluid pressure chamber of said resilient sealing element.

7. In combination with a pair of pipe members and a sleeve connector member connecting ends of said pipe members in a spaced apart relationship, a valve housing constructed and arranged to fit within the pipe members and having a mounting flange positioned within the spacing between connected ends of the pipe members, said housing defining a fluid passageway therethrough, a valve operably positioned on said housing to open and close said passageway, a fluid-pressure-sensitive sealing means carried by said valve housing, said sealing means having portions defining a fluid pressure chamber and terminating in feathered edges, said feathered edges being constructed and arranged to abut outer walls of said housing and inner walls of one of the members, and a fluid passageway through said flange for by-passing fluid to the pressure chamber of said sealing means.

8. A valve structure adapted to be positioned within inner walls of a fluid-conducting pipe line which comprises, a valve body defining a fluid passageway therethrough, a valve seat portion about said passageway, said valve body having a portion constructed and arranged to loosely position said body within inner walls of the pipe line, a float valve, a cage portion carried by said valve body and constructed and arranged to operably position said float valve in an operative relationship with said valve seat portion, a resilient sealing element, said valve body having an offset portion adjacent its outer periphery constructed and arranged to receive said sealing element therein, said sealing element having a heel portion positioned in abutment with an abutment face of said offset portion, said sealing element having spaced-apart inner and outer wall portions defining a fluid pressure chamber and extending from the heel portion thereof, the outer wall portion of said sealing element being constructed and arranged to press against inner walls of the pipe line, the inner wall portion of said sealing element being constructed and arranged to press against an adjacent peripheral portion of said valve body, said valve body having spaced-apart portions providing a fluid passageway from the pipe line to the chamber of said resilient element, said sealing element being constructed and arranged to seal off fluid flow between said body portion and inner walls of the pipe line and to securely position said body portion when fluid pressure is applied to the fluid pressure chamber thereof.

FERDINAND J. SPANG.

REFERENCES CITED

The following references are of record in the file of this patent:

UNITED STATES PATENTS

| Number | Name | Date |
|---|---|---|
| Re. 7,580 | Morrison | Mar. 27, 1877 |
| 213,346 | Rew | Mar. 18, 1879 |
| 249,231 | Eagen | Nov. 8, 1881 |
| 1,139,647 | Dehn | May 18, 1915 |
| 1,369,279 | Holmes | Feb. 22, 1921 |
| 1,380,415 | Putnam | June 7, 1921 |
| 1,577,740 | Macomber | Mar. 23, 1926 |
| 1,623,207 | Poulsen | Apr. 5, 1927 |
| 1,829,451 | McNab | Oct. 27, 1931 |
| 1,919,510 | Harrington | July 25, 1933 |
| 1,984,328 | Bechtold | Dec. 11, 1934 |
| 2,153,812 | Newton | Apr. 11, 1939 |

FOREIGN PATENTS

| Number | Country | Date |
|---|---|---|
| 115,819 | Austria | Jan. 10, 1930 |